United States Patent
Rodemann et al.

(10) Patent No.: US 11,385,631 B2
(45) Date of Patent: Jul. 12, 2022

(54) METHOD AND SYSTEM FOR DETECTING FAULTS IN A CHARGING INFRASTRUCTURE SYSTEM FOR ELECTRIC VEHICLES

(71) Applicant: Honda Research Institute Europe GmbH, Offenbach/Main (DE)

(72) Inventors: Tobias Rodemann, Offenbach (DE); Sebastian Schmitt, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 71 days.

(21) Appl. No.: 17/094,817

(22) Filed: Nov. 11, 2020

(65) Prior Publication Data

US 2022/0147035 A1 May 12, 2022

(51) Int. Cl.
  *G05B 23/02* (2006.01)
  *H02J 7/00* (2006.01)

(52) U.S. Cl.
  CPC ........ *G05B 23/0259* (2013.01); *H02J 7/0029* (2013.01); *H02J 7/0047* (2013.01)

(58) Field of Classification Search
  CPC ...... H02J 7/0029; H02J 7/0047; G05B 15/02; G05B 23/0259
  See application file for complete search history.

(56) References Cited

U.S. PATENT DOCUMENTS

| 9,261,375 B2 | 2/2016 | Appel et al. |
| 10,040,365 B2 | 8/2018 | Pflaum et al. |
| 10,295,604 B2 * | 5/2019 | Oh ........................ G01R 31/367 |
| 10,333,335 B2 * | 6/2019 | Cong ....................... H02J 7/027 |
| 10,759,297 B2 * | 9/2020 | Mehling ..................... H02J 7/04 |
| 2011/0133693 A1 * | 6/2011 | Lowenthal .............. B60L 53/30 320/109 |

(Continued)

FOREIGN PATENT DOCUMENTS

| CN | 107133415 | 9/2017 |
| CN | 108269008 | 7/2018 |

OTHER PUBLICATIONS

Varun Chandola, et al., "Anomaly Detection: A Survey," ACM Computing Surveys, Jul. 2009, pp. 1-75.
Sajjad Abedi, et al., "Cyber Security of Plug-in Electric Vehicles in Smart Grids: Application of Intrusion Detection Methods," Plug In Electric Vehicles in Smart Grids, Jan. 2015, pp. 1-20.

(Continued)

*Primary Examiner* — Ronald D Hartman, Jr.
(74) *Attorney, Agent, or Firm* — JCIPRNET

(57) ABSTRACT

A method for determining an anomalous operating state in a charging infrastructure system for batteries is proposed. For a charging process at a charging station, the method includes obtaining target characteristics of the charging process, determining process parameters for the charging process, performing the charging process, determining a performance metric for the performed charging process, generating and storing a data set for the performed charging process in a database. For multiple charging processes, the method includes calculating and storing at least one first set of statistic data for a first time interval and at least one second set of statistic data for a second time interval, comparing the first set of statistic data with the second set of statistic data to compute a set of difference values for each stored data set, and determining whether the charging infrastructure system operates in an anomalous operating state.

17 Claims, 2 Drawing Sheets

(56) References Cited

U.S. PATENT DOCUMENTS

| | | | | |
|---|---|---|---|---|
| 2012/0098497 | A1* | 4/2012 | Ogane | H01M 10/443 320/134 |
| 2012/0133325 | A1* | 5/2012 | Thomas | H02J 7/00036 320/109 |
| 2013/0020993 | A1* | 1/2013 | Taddeo | B60L 53/16 320/109 |
| 2013/0090871 | A1* | 4/2013 | Akahori | G01R 31/3828 702/63 |
| 2013/0193907 | A1* | 8/2013 | Thomas | H02J 7/0047 324/750.3 |
| 2018/0215279 | A1* | 8/2018 | Beekmann | H02J 7/0042 |
| 2018/0297473 | A1* | 10/2018 | Helnerus | B60L 3/0092 |
| 2019/0118671 | A1* | 4/2019 | Helnerus | B60L 53/16 |
| 2019/0168619 | A1* | 6/2019 | Hooker | B60L 53/665 |
| 2019/0285703 | A1 | 9/2019 | Juva et al. | |
| 2019/0366865 | A1* | 12/2019 | Morimoto | H02J 7/008 |

OTHER PUBLICATIONS

Tim Streubel, et al., "Detection and Monitoring of Supraharmonic Anomalies of an Electric Vehicle Charging Station," 2019 IEEE Milan PowerTech, Jun. 2019, pp. 1-5.

Tobias Rodemann, et al., "Using Agent-Based Customer Modeling for the Evaluation of EV Charging Systems," Energies, Jul. 2019, pp. 1-16.

J. Helmus, et al., "Key Performance Indicators of Charging infrastructure," World Electric Vehicle Journal, vol. 8, Jun. 2016, pp. 1-9.

Tobias Rodemann, et al., "Simulation-Based Design and Evaluation of a Smart Energy Manager," Computer Aided Systems Theory—EUROCAST 2019, Apr. 2020, pp. 1-8.

Vishu Gupta, et al., "EV Benefit Evaluation in a Collaborative Scheduling Environment with Penalties for Unscheduled EVs," 2018 8th IEEE India International Conference on Power Electronics (IICPE), Dec. 2018, pp. 1-6.

* cited by examiner ized system performance that deviates from
METHOD AND SYSTEM FOR DETECTING FAULTS IN A CHARGING INFRASTRUCTURE SYSTEM FOR ELECTRIC VEHICLES

TECHNICAL FIELD OF THE DISCLOSURE

The invention concerns the field of fault detection in charging infrastructure systems for charging batteries, in particular charging batteries of electric vehicles. In particular, a method, a program and a system for detecting anomalous operating states in the charging infrastructure system are proposed.

BACKGROUND

A key component of a charging infrastructure for batteries of electric vehicles are charging stations arranged spatially distributed and providing the capability to recharge batteries of the electric vehicles from a mains grid with electric energy. Availability and correct functioning of the charging stations is a key component for increasing the proportion of electric mobility on overall individual mobility.

Known charging infrastructure systems including charging stations for electric vehicles rely on a basic charging strategy. As soon as an electric vehicle is connected to the charging station and technical aspects of charging as well as economic aspects such as debiting for the charged amount of energy are settled, a charging process is started. The charging process comprises charging the battery of the electric vehicle with a set maximal electric power and terminating the charging process when a battery of the electric vehicle is fully charged.

More recent charging infrastructure systems need to consider several conflicting objectives in performing the charging process. Such conflicting objectives in performing the charging process may include minimizing system operation cost of the charging infrastructure system, maintaining or increasing a grid stability of a mains grid under circumstances resulting from intermittent energy sources and fluctuating energy consumption, minimizing energy-related emissions under aspects of climate protection, and improving satisfaction of customers with the charging infrastructure. Charging infrastructure systems taking these partially conflicting objectives into account for controlling the charging process are complex and prone to malfunction. The large complexity of these charging infrastructure systems renders a manual supervision difficult, expensive or even impossible. Therefore, automated system monitoring of the charging infrastructure system is preferred over manual supervision.

It may occur that a performance of the charging infrastructure system deteriorates due to a hardware defect, a software update, or even only due to a differing behaviour of customers when compared to a behaviour of the customers as originally anticipated during design, test and implementation of the charging infrastructure system.

Typical problems with system performance may originate from subtle software bugs or faulty logics that still maintain the basic operation of the charging infrastructure system, such as performing a charging process for the battery of the electric vehicle, but the whole charging infrastructure system is not functioning as intended. Also, a user interface of the charging station may not be working properly and customers are entering incomplete or even wrong data.

While severe hardware malfunctions are easy to detect automatically, smaller changes in system components or user behaviour might lead to unsatisfying results for the charging process and deterioration of overall system performance, however without exhibiting an obvious and easy detectable malfunction of an individual system component.

The target of the invention is to provide an automatic monitoring system that investigates individual charging processes and identifies system operating states of the charging system in which a current system performance deviates from a targeted system performance.

SUMMARY

The problem is solved by the method according to a first aspect, the computer program according to a second aspect and the system for detecting anomalous operating states according to a third aspect.

The method for detecting anomalous operating states in a charging infrastructure system for charging batteries, in particular batteries of electric vehicles, according to the first aspect comprises steps of: for a charging process at a charging station, obtaining, for the charging process, target characteristics of the charging process, determining process parameters of the charging process based on the obtained target characteristics, and performing the charging process based on the determined process parameters. The method proceeds by determining a performance metric for the performed charging process based on the obtained target characteristics, and generating a data set for the performed charging process. The data set comprises meta information of the performed charging process, the determined target characteristics of the performed charging process associated with determined, for example measured, variables for the performed charging process and the determined performance metric for the performed charging process. The method stores the generated data set in a database. The method proceeds by, for a plurality of charging processes, calculating and storing at least one first set of statistic data based on stored data sets of the plurality of charging processes in the database for a first time interval and at least one second set of statistic data based on the stored data sets in the database for a second time interval. Subsequently, the at least one first set of statistic data is compared with the at least one second set of statistic data for each stored data set to compute a set of difference values for each stored dataset. The method determines, based on the computed set of difference values for each data set, whether the charging infrastructure system operates in an anomalous operating state.

The second aspect concerns a non-transitory computer readable medium storing a computer program with program-code means for executing the steps according to one of the embodiments of the method for detecting an anomalous state in a charging infrastructure system for charging batteries, particularly batteries of electric vehicles, when the program is executed on a computer or digital signal processor.

In a third aspect, the system for detecting anomalous states in a charging infrastructure system for charging batteries, in particular batteries of electric vehicles, comprises: at least one electric charging station including an electric charger configured to charge an energy storage (battery) in a charging process; an interface configured to obtain target characteristics of the charging process, at least one processor configured to determine for the charging process, process parameters based on the obtained target characteristics of the charging process and to determine a performance metric for the performed charging process, the performance metric based on the obtained target characteristics and determined variables of the charging process during executing (performing) the charging process. The processor is further configured to generate a data set for the performed charging process. The data set comprises meta information of the performed charging process, the determined target characteristics of the charging process associated with the determined, in particular measured, variables for the performed charging process and the determined performance metric for the performed charging process. Furthermore, the at least one processor is configured to store the generated data set in a database. The processor is configured to, for a plurality of charging processes, calculate and store at least one first set of statistic data, computed based on the stored data sets in the database for a first time interval and at least one second set of statistic data, which is computed based on the stored data sets in the database for a second time interval. The processor is configured to compare the at least one first set of statistic data with the at least one second set of statistic data for each stored data set to compute a set of difference values for each stored data set, and to determine, based on the computed set of difference values for each data set, whether the charging infrastructure system operates in an anomalous operating state.

BRIEF DESCRIPTION OF THE DRAWINGS

A description of an embodiment discusses the enclosed figures.

DETAILED DESCRIPTION

Figure 1:
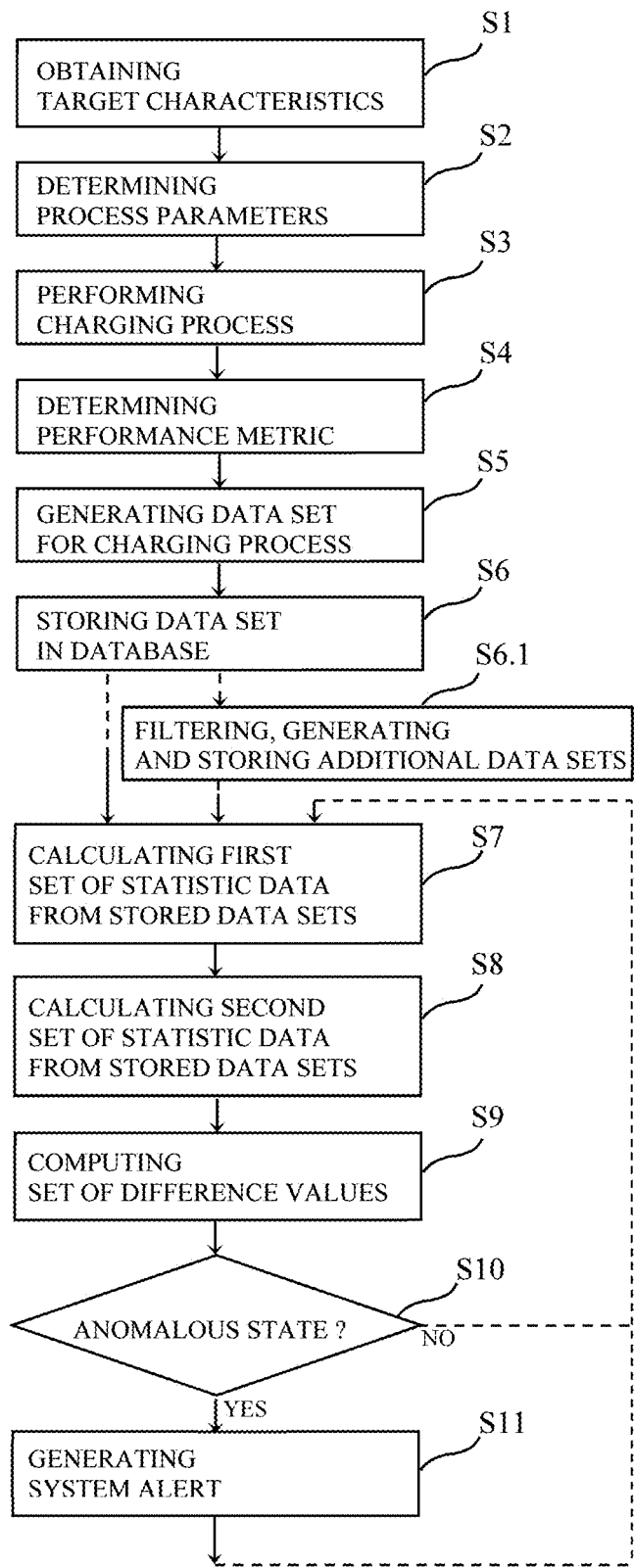
FIG. 1 shows a simplified flowchart of an embodiment of the method for detecting anomalous states in a charging infrastructure system for electric vehicles.

In state-of-art work, the performance of charging stations is monitored via an analysis of internal hardware and software states. In case of a technical defect, the charging station displays an error message, and connects to a service team. Contrary to known automated monitoring systems, the claimed approach may use target characteristics for each charging process, for example customer satisfaction indicators (CSIs) as the main features for the system monitoring. Thus, obtained target characteristics in a specific charging process operation from the perspective of the user become the key criterion for evaluating system performance. Even issues with system performance arising from problems in an internal charging control algorithm of the charging system infrastructure become detectable.

Furthermore, the method provides a capability for inferring the type of failure in a detailed fashion since the method calculates various different statistical measures from the data sets of a plurality of charging processes, which allow for a detailed analysis into the type of failure or system anomaly.

In particular, the method even addresses problems concerning a user interface of the charging station, for example when the user interface is not working properly and the user enter wrong or incomplete data.

The invention proposes a system connected to a plurality of charging stations, which implement a method that monitors the efficiency of executed charging processes from a user perspective. The method compares the planned and targeted result of a charging process—as determined before the charging process starts at the charging station—with the actual results of the charging process—as determined by the charging station, for example by measuring variables of the performed charging process. Based on this comparison, a performance metric customer satisfaction indicator (CSI) is computed for every charging process and stored in the database. An aggregation of these basic data sets acquired for a plurality of processes, preferably for each performed charging process, enables to calculate and store further data sets including statistic evaluations of the basic data, the sets of statistic data including at least a first set of statistical data and a second set of statistical data over differing time intervals (time windows). Evaluating these sets of statistical data enables to derive information therefrom, whether an anomalous operating state of the charging system may be assumed.

The method according to an advantageous embodiment comprises a step of generating and outputting a system alert and/or failure data when determining an anomalous operating state of the charging infrastructure system.

Thus, the method provides information for service personal to act on presumed anomalies during operation of the charging infrastructure system, and even may provide clues, which aspects of operation require attention to improve customer satisfaction.

In an advantageous embodiment, the method further comprises outputting the determined target characteristics to a user of the charging station, and accepting a user input that changes or selects at least one of the output target characteristics for the charging process.

Thus, the user provides or at least influences the target characteristics of the intended charging process, and accordingly influences the performance metric and the basic data set stored for each charging process. The method for determining anomalous operating states thus exceeds a mere monitoring of system performance by measuring some predetermined technical parameters of the charging stations continuously.

The method according to a particularly advantageous embodiment performs the step of determining a performance metric as including determining a customer-satisfaction indicator as the performance metric.

A customer satisfaction indicator, sometimes abbreviated as CSI, denotes an algorithmic approximation of a customer's satisfaction of a product or service provided to the customer. In the present context, the service may refer to charging the battery, in particular the battery of an electric vehicle. The customer is here the user of the electric vehicle. The customer satisfaction indicator is sometimes also denoted as customer satisfaction level.

Using the customer satisfaction indicator, which may be determined using a specific algorithm from measurable process parameters of the charging process and target values for these process parameters for this particular instance of the charging process provides an insight on actual system states of the charging infrastructure system when employing suitable statistic evaluation over a plurality of charging processes. The target values for the process parameters for this particular instance of the charging process may be acquired from the user via a dialog using an expanded version of a human machine interface present at known charging stations.

The method may include determining, whether the charging infrastructure system operates in an anomalous state, by applying a method of anomaly detection on the first and second sets of statistic data.

The computed and stored first and second sets of statistic data enable to apply generally known algorithms for anomaly detection or outlier detection to yield information on the operating state of the charging infrastructure system. This provides service personnel with information exceeding those provided by a built-in test equipment BITE of the charging infrastructure system.

The method according to an embodiment applies a predefined rule set or a trained machine learning model as the method of anomaly detection on the first and second sets of statistic data.

According to an embodiment, the method includes performing the method of anomaly detection by applying the trained machine learning model, and the trained machine learning model includes a mathematical expression. In particular a decision tree algorithm, a random forest algorithm, a neural network, or a deep neural network are examples for the mathematical expression.

The target characteristics of the charging process may include at least one of a target state-of-charge, target charged energy, target minimum state-of-charge, target range of the electric vehicle, and target departure time.

The cited target characteristics provide targets the user of a charging station might deem essential for judging a procured service, in present case the charging process, as satisfying and successful. Those target characteristics are measurable and quantifiable and thus enable to base a performance metric taking the user's point of view into consideration thereon.

The determined variables can include at least one of date of the charging process, time of the charging process, identifier of charging station by which the charging process is performed, location of charging station performing the charging process, type of the performing charging station, type (model) of electric vehicle whose battery is charged, type of battery, which is to charged, weather parameters at the time of the charging process, and termination type of charging process.

Termination type of the charging process may include, for example, if the charging process is started at all, or if the user terminates the charging process without reaching a preset target characteristic, or if reaching one or all of the determined target characteristics induces the charging station to terminate the charging process. All these aspects included in the basic stored data sets, which with the claimed further statistic evaluation provide insight on charging performance of the charging infrastructure system and its components from the user's point of view.

The method according to an embodiment further comprises steps of computing additional sets of statistic data by filtering the determined variables of the charging process with respect to different features and calculating the additional sets of statistic data for the first time interval and the second time interval from the filtered determined variables, and storing the computed additional sets of statistic data in the database.

The method may further include determining whether the charging infrastructure system operates in an anomalous operating state based on the computed set of difference values computed on the stored sets of statistic data including the computed additional sets of statistic data.

The different features for filtering may include, for example, a vehicle type or a type of charging station.

According to an embodiment, the method includes calculating the at least one first set of statistic data and the at least one second set of statistic data, wherein the first time interval is shorter than the second time interval, in a particular the first time interval is shorter than the second time interval by an order of magnitude.

A further embodiment is configured to adapt at least one of a first interval length of the first time interval and a second interval length of the second time interval based on the plurality of stored data sets or training data sets for the charging infrastructure system. In particular, at least one of the first interval length and the second interval length may be adapted by using machine learning and optimization methods.

Statistic evaluation of the stored data sets over a plurality of charging processes using time intervals of differing time length enables to transform the stored data sets into sets of statistic data, which enables to use methods of outlier detection advantageously to gain information on charging system performance. Machine learning and optimization techniques offer an efficient possibility to design suitable values for the interval length of the first and second time interval. This in particular applies for using training data sets, for example training data sets of simulated charging processes for adapting the length of the first and second time interval. Training data sets may alternatively or additionally be used for devising initial values for the interval lengths of the first and second time interval or recalibrating the first and second interval lengths during operation of the system.

The claimed method is particular advantageous when implemented on or more computer servers for processing the large amounts of data acquired and stored over extended intervals of time and a multitude of charging processes.

FIG. 1 depicts a simplified flowchart of an embodiment of the method for detecting anomalous operating states (also "the method" hereinafter) in a charging infrastructure system 1 for electric vehicles EV. Structural components of the charging infrastructure system 1, including charging stations 2, 3, 4, will be discussed in more detail with respect to FIG. 2 succeeding the discussion of embodiments of the method for detecting anomalous states in a charging infrastructure system 1.

An anomalous state of the charging infrastructure system 1 may in particular refer to a potential system fault of the charging infrastructure system 1.

The system for detecting anomalous states executing the method ("the system" hereinafter) is connected to one ore preferably plural charging stations 2, 3, 4. The system specifically monitors and analyses an efficiency of performed charging processes from a perspective of a user U of the charging infrastructure system 1.

In particular, the system for detecting anomalous states compares in a (first) sub-process planned and targeted results of an executed charging process—as determined before the charging process starts at the charging station 2—with actually achieved results of the charging process—as determined by the charging station 2. Based on the comparison, a performance metric, in particular a customer satisfaction indicator (CSI) is computed for the executed charging process and stored in a database 21.

The first sub-process is preferably executed for each performed charging process performed by the charging stations 2, 3, 4. The first sub-process comprises steps S1, S2, S3, S4, S5, and S6 in the flowchart of FIG. 1.

Figure 2:
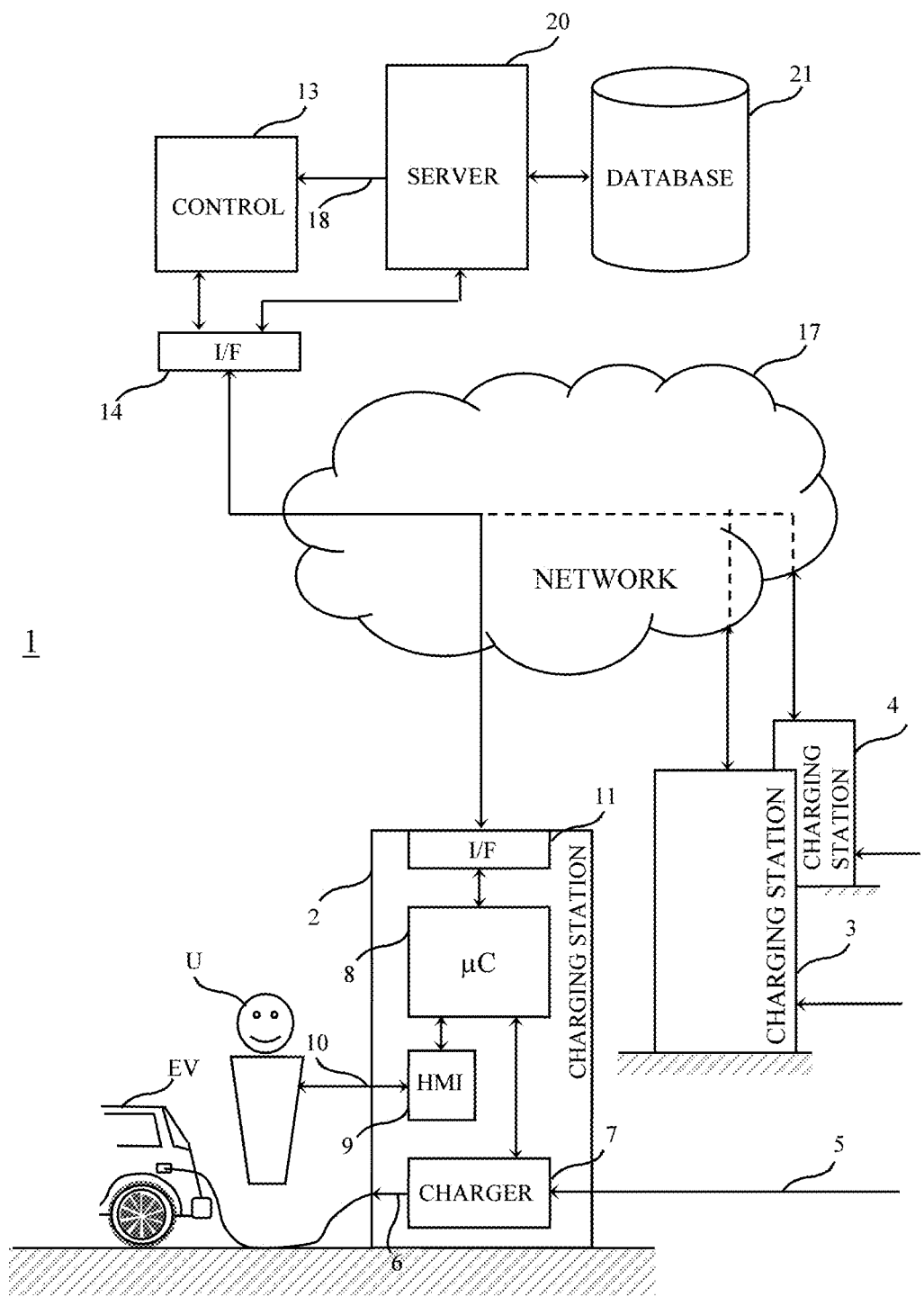
FIG. 2 depicts a charging infrastructure system for electric vehicles in a simplified block diagram, the charging infrastructure system employing an embodiment of the system for detecting anomalous states in the charging infrastructure system.

A user U arrives with an electric vehicle EV at a charging station 2 (see FIG. 2).

In step S1, the charging infrastructure system 1 determines user specific information including target characteristics for the intended charging process of the user U of the electric vehicle EV before the actual charging process starts.

User specific information includes in particular target characteristics for the envisaged charging process at the charging station 2. Other use specific information may include information on the user U, the electric vehicle EV, or commercial information, for example, billing credentials, concerning the user U.

The target characteristics may include a planned departure time t_departure of the user U with his electric vehicle EV and a targeted battery state-of-charge SoC_target for the electric vehicle EV. The targeted battery state-of-charge SoC_target for the charging process refers in particular to a battery state-of-charge SoC, which is intended by the user U to be reached when terminating the charging process as planned.

The battery state-of-charge SoC denotes a state-of-charge of the battery of the electric vehicle EV, which may be expressed as a percentage ranging from 0%-100% of a full battery capacity of the battery. The state-of-charge provides a measure for the electric energy stored in the battery of the electric vehicle EV at a specific point in time. The battery targeted battery state-of-charge SoC_target may be assumed as equivalent to or at least convertible to a targeted driving range of the electric vehicle EV.

Additionally or alternatively, the target characteristics can include a driving range of the electric vehicle EV. Optionally, additional information like a minimum state-of-charge minimum_SoC, which is to be reached as soon as possible can be provided by the customer or determined as part of the target characteristics by the charging infrastructure system 1 from the information provided by the user U.

The method may present predetermined target characteristics and proposed values for target characteristics as options for the planned charging process to the user U in order to get confirmation on the presented options. The user U of the charging station 2 may give some preferences on this customer specific information or may select from multiple charging process parameters and choices for target characteristics offered to him via a human machine interface HMI of the charging station 2.

The planned values for the target characteristics of the planned charging process, for example planned departure time t_departure and the targeted battery state-of-charge SoC_target may be derived from a logic reasoning based on various input values such as vehicle type (vehicle model) of the electric vehicle EV, a charging station type of the charging station 2 and a location of the charging station 2, a time of day, a day of week, current month and year.

Alternatively or additionally, the user U may be asked to input generic preferences on the planning schedule for the planned charging process, and the charging infrastructure system 1 may present options for the planned charging process to the user U based on the input generic preferences on the planning schedule for the planned charging process.

In step S2, the system determines process parameters for the planned charging process from the target characteristics obtained in step S2. The process parameters may include a start time for the charging process, a presumed termination time for the charging process, a target charge current, an energy amount to be transferred during the charging process, an energy mix for the charging process, for example indicating a proportion of energy from renewable energy sources.

The charging process is then started. In step S3 the charging infrastructure system 1 performs the charging process according to the process parameters determined in preceding step S2.

During execution of the charging process, an energy storage of the electric vehicle EV is charged with electric energy provided by a charger of the charging station 2.

The charging station 2 terminates the performed charging process, for example, when determining one or more termination criteria for the planned charging process are met. Alternatively, the charging process may be terminated due to a termination request by the user U or by the charging station 2 or the charging infrastructure system 1. During performing the charging process, the method determines various variables of the actually performed charging process. The recorded variables may in particular include measured variables related to the determined process parameters and the target characteristics obtained and determined in advance before starting the charging process.

As one mere example, the target characteristics may include the actually planned departure time t_departure of the user U. Consequently, the actual process parameters may comprise amongst other process parameters the presumed termination time for the charging process. The measured variable of the actually executed charging process will in this example include the value for the actual termination time of the performed charging process.

After terminating the charging process the method proceeds with step S4 by determining a performance metric for the performed charging process based on the obtained target characteristics and the determined values of the variables of the actually performed charging process of Step S3.

In step S4, the method computes the performance metric for the charging process in particular by comparing the obtained values for the planned target characteristics with the measured values for the actually achieved values for the target characteristics of the performed charging process. The performance metric is adapted to provide a criterion for quantifying the performed charging process with respect to the originally planned charging process.

In particular, the computed performance metric bases on a mathematical model of customer satisfaction specific for the user U. The performance metric may be a customer satisfaction indicator CSI, in particular an algorithmic expression indicating a measure for a customer satisfaction denoted as customer satisfaction indicator model.

Exemplarily, two exemplary customer satisfaction indicator models (CSI models) for use in embodiments of the invention are discussed. Other models for customer satisfaction are known and may be used instead or in addition to the discussed CSI models when determining the performance metric in step S4.

The method may compute a first, basic model for customer satisfaction based on the difference between the values for SoC_target and SoC_act:

$$CSI\_1 = \min(1, 1-(SoC\_target - SoC\_act)) \quad (1)$$

In expression (1), CSI_1 is a customer satisfaction indicator according to the first model, SoC_target is the targeted state-of-charge and SoC_act the actually measured state-of-charge when terminating the charging process. SOC_act may also refer to actual battery state-of-charge when the performed charging process is terminated.

Additionally or alternatively, a second, more sophisticated model for customer satisfaction (CSI model) may use both a non-linear function of SoC_target−SoC_act, as well as the SoC curve progression SoC (t) over the performed charging process to compute a customer satisfaction indicator (actual CSI value) CSI_2 according to the second model for customer satisfaction:

$$CSI\_2 = \begin{cases} \frac{(SoC_a - SoC_{ini})}{(SoC_d - SoC_{ini})}, & \text{if } SoC_a < SoC_d \\ 1, & \text{else} \end{cases} \quad (2)$$

In expression (2), CSI_2 is a customer satisfaction indicator according to the second model, $SoC_d$ is the targeted state-of-charge provided by the user U, $SoC_{ini}$ the state of charge on arrival at the charging station or at the start of the charging process, and $SoC_d$ the actually measured state-of-charge when terminating the charging process or the user U's departure. The article "Using Agent-Based Customer modeling for the evaluation of EV-charging systems, by Tobias Rodeman, Tom Eckhardt, R. Unger and Torsten Schwan, published in: Energies 2019, 2858, doi:10.3390/en12152858 by MDPI, discusses the proposed second model in more detail.

In expression (1), the curve progression of the battery state-of-charge SoC over time during performance of a charging process may be a function of time between an arrival time and a departure time, or a function of time between the start time of the performed charging process and the termination time of the performed charging process for the electric vehicle EV at the charging station 2.

Essentially, the proposed first and the second CSI model provide high CSI values when the charging station 2 provides a measured SoC value for SoC_act, which corresponds to or exceeds the value for SoC_target initially provided by the user U.

In case, however, the charging station 2 provides a measured SoC value for SoC_act, which fails to reach the value for SoC_target, a respectively lower CSI value is provided by either of the first and second CSI models.

Determined CSI values for the performance metric may vary substantially between individual instances of charging process due to various factors. For example, factors such as vehicle type of the electric vehicle EV, charging station type of the charging station 2, and charging station location may all influence the performance characteristics of the actually executed charging process. A single low CSI value is accordingly not interpreted as a reliable indicator of a system error of the charging infrastructure system 1.

The method relies as indicator of a system level problem in the charging infrastructure system 1 on detecting a change in general statistics of CSI values in recent times relative to the long-term statistics of CSI values.

The method proceeds after step S4 with step S5, in which the method generates a data set for the performed charging process. The generated data set comprises the determined target characteristics of the charging process associated with the determined, for example measured, variables for the performed charging process and the value for the performance metric determined in step S4 for the performed charging process.

When terminating the charging process, the method records all relevant characteristics of the actual charging process. This recorded data set may include entries such as the actual departure time t_ad of the electric vehicle EV from the charging station 2 and the battery state-of-charge SoC_act at the actual departure time t_ad.

Additionally or alternatively, the method may record in the data set a state-of-charge curve progression with time SoC (t) (SOC trajectory) between an arrival time, in particular a start time for starting the charging process, and a departure time, in particular a termination time of the performed charging process.

For the performed charging process (corresponding to a charging event), the system generates a corresponding data entry (data set) in a database 21. The database 21 stores a plurality of data sets, each data set including data of one corresponding charging process. Preferably, a data set is generated and recorded for each performed charging process.

The data set includes meta information. The meta information is general information describing each individual charging process. The meta information includes in particular determined variables of the charging process.

The data set may include general information such as the date of the charging process, the location of a charging station, which performed the charging process, a type of the charging station, which performed the charging process, a type of the electric vehicle EV, which was charged, a number of occupied and unoccupied charging slots at the charging station 2, for example.

The data set may include general information such as specific information on the planned characteristics of the charging process, for example, including data on the user U's arrival time, planned charging process start time, targeted SoC after charging, minimum SoC after charging, planned departure time, maximal and minimal planned charging power.

The data set may include specific information on the actual characteristics of the performed charging process such as a reached SoC, a termination time of the charging process, an actual departure time of the electric vehicle EV, a time curve SoC (t) of the charging state of the charged battery of the electric vehicle EV during the entire charging process, for example.

The data set for the charging process stored in the database 21 further includes data on the performance metric computed for this charging process, which is calculated based on, in particular directly from the determined or measured variables of the performed charging process and the initially obtained values for the target characteristics of the charging process.

The method stores the generated data set in a database 21 in step S6 succeeding to step S5.

The method stores in particular the calculated values for the performance metric. The stored data set also includes meta information of the performed charging process, and further includes a time stamp. The database 21 thus comprises a time-series of data sets.

The method may include a step S6.1. In step S6.1, the method computes additional sets of statistic data by first filtering the determined variables of the charging process with respect to different features, e.g. particular types of vehicles or charging station types. The method then calculates the additional sets of statistic data for the first time interval and the second time interval from the filtered determined variables. The method stores also the computed additional sets of statistic data in the database 21.

The database 21 contains entries from all charging stations 2, 3, 4 of the charging infrastructure system 1, which are monitored by the system for determining an anomalous state. Each entry refers to one charging process (charging event) with corresponding time stamp. The plurality of entries in the database 21 corresponding to a time series of data sets thus constitutes a time series of events (sequence of events).

The second sub-process includes steps S7 to S11 of the flowchart in FIG. 1.

These steps perform an analysis of the time series of data sets, each including a performance metric value, preferably calculated using at least one CSI model. The second sub-process is executed for a plurality of data sets, most or all data set being generated by performing steps S1 to S6 according to the first sub-process.

Alternatively or additionally, at least some of the data sets of the plurality of data sets may originate from a simulation of the charging infrastructure system 1 and simulated charging processes.

Multiple ways for computing performance metric statistics may be used in parallel, and for each distinct way, the method may compute a separate set of statistic data and store the computed set of statistic data in the database 21.

These different sets of statistic data calculated from values of the performance metric in the data sets enable to derive information on potentially anomalous operating states of the charging infrastructure system 1 as a whole, or anomalous operating states of one or more individual charging stations 2, 3, 4 of the charging infrastructure system 1.

The method may compute the different sets of statistic data by calculating the performance metric statistics for the following subsets of data sets stored in the database 21:

A subset may include all datasets corresponding to charging operations performed by each individual charging station 2, 3, 4.

A subset may include all datasets corresponding to charging operations performed by all charging stations 2, 3, 4 located at a same charging site (charging location).

A subset may include all datasets corresponding to charging operations for each different type of charging station 2, 3, 4, irrespective of the location or charging site.

A subset may include all datasets corresponding to charging operations for each different type of charging station 2, 3, 4, further discriminating with respect to charging station type, charging station model, charging station manufacturer and charging station make.

A subset may include all datasets corresponding to all charging operations from all charging stations 2, 3, 4, irrespective of charging station site (charging location) or charging station type.

A subset may include all datasets corresponding to all charging operations for each individual charging station 2, 3, 4 and each electric vehicle model.

A subset may include all datasets corresponding to all charging operations for all charging stations 2, 3, 4 located at a same charging site and for each electric vehicle model.

A subset may include all datasets corresponding to all charging operations for each different charging station type for each electric vehicle model.

A subset may include all datasets corresponding to all charging operations for all charging stations 2, 3, 4 and for each electric vehicle model.

The computed sets of statistic data include statistics for the performance metric values of the performance metric derived from two time intervals w_short and w_long, which are compared for each set of statistic data.

The method proceeds by calculating for a plurality of charging processes, and storing at least one first set of statistic data based on stored data sets of the plurality of charging processes in the database 21 for a first time interval in step S7.

Furthermore, the method calculates for a plurality of charging processes, and stores at least one second set of statistic data based on stored data sets of the plurality of charging processes in the database 21 for a second time interval in step S8.

Steps S7 and S8 might be executed in parallel or sequentially.

The steps S7 and S8 may be performed at predefined points in time t_calc. The points in time t_calc may be at regular time intervals, for example, once at every hour or once per day, for example every night at 1:00 a.m.

At the predefined point in time t_calc, the system computes a multitude of statistic measures for the performance metric values from the stored data entries, separately for two different time intervals, w_short and w_long.

Subsequently, in step S9, the at least one first set of statistic data is compared with the at least one second set of statistic data for each stored data set to compute a set of difference values for each stored data set.

The method determines in step S10, based on the computed set of difference values for each data set, whether the charging infrastructure system 1 operates in an anomalous operating state.

The step S10 of determining whether the charging infrastructure system 1 operates in an anomalous operating state based on the computed set of difference values bases on the computed difference values on the stored sets of statistic data, and includes the difference values computed on the additional sets of statistic data.

The method computes statistical features of performance metric values for charging processes stored in the database 21 over two time intervals. The first time interval and the second time interval differ in their respective interval length (window length) from each other. The first time interval (short time interval) has a first interval length, which is smaller than a second interval length of the second time interval (long time interval).

The first interval length may be smaller by one order of magnitude than the second interval length.

The first and second interval length of the first and second time intervals may be adapted based on the characteristics of the charging infrastructure system 1.

Calculating the sets of statistic data in steps S7 and S8 may include computing statistical features such as a mean, a median, variances, and more advanced time-series features like auto-correlations or a matrix profile of the CSI values in the first and the second time interval respectively. These statistical features can be calculated for many sub-sets of the entire plurality of datasets, respective the instances of CSI values included in the datasets stored in the data base 21.

The database 21 contains entries from all charging stations 2, 3, 4, which are operated by the charging infrastructure system 1. On predefined points in time t_calc, the method may execute steps S7 and S8 and computes the plurality of statistic measures for the CSI values from the datasets stored in the database 21, separately for the two different time intervals, w_short and w_long.

W_short refers to the first time interval extending over a first time span. The first time interval may extend over recent times, such as the last day, for example.

W_long refers to a second time interval extending over the history (sequence) of datasets from within the second time interval in the past, for example, all data sets from a last month.

The exact specification of the predetermined time intervals w_short and w_long can be predetermined in advance by experts and set to predetermined and fixed values.

Machine learning and optimization techniques may be used to design and to adapt suitable values for the interval length of the first and second time interval. Training datasets, for example training datasets of simulated charging processes for adapting the length of the first and second time interval may be used for an machine learning and optimization of the interval lengths of the first and second time intervals w_short and w_long.

Training datasets may alternatively or additionally be used for devising initial values for the interval lengths of the first and second time interval or recalibrating the first and second interval lengths during operation of the system at regular intervals.

Possible predetermined values in a preferred embodiment include the first time interval w_short extending over the last 24 hours.

Possible predetermined values in a preferred embodiment include the second time interval w_long extending from yesterday to 31 days bevor today.

Alternatively, the method may adapt the values of the first and second interval length for the first time interval and the second time interval respectively, in particular by using machine learning and optimization methods for determining the first and the second time interval.

The second sub-process continually monitors the performance metric values for all charging stations 2, 3, 4 monitored by the method for detecting anomalous states over time and calculates statistics over the performance metric values over time and stores the calculated first and second sets of statistic data in the database 21.

In particular, the statistical data over the CSI values are calculated over many different sub-sets of the data stored in the database 21, therefore allowing a detailed analysis of the data sets stored in the database 21. The method thus generates various sets of statistic data for CSI values of the performance metric.

A first set of statistics includes statistics of all charging processes, in particular all stored CSI values. A second set of statistics is provided by the statistics, which the system calculates only from the charging processes of one specific charging station at one specific location. Yet another, third set of statistics is provided by the statistics which the system calculates from charging processes of all charging stations from one specific location and only for charging of one specific vehicle type.

After computing at least one first set of statistic data and at least one second set of statistic data in steps S7 and S8 respectively, the method proceeds by step S9, in which the method computes a set of difference values based on the first at least one first set of statistic data and the at least one second set of statistic data. In particular, in step S9, the method compares the at least one first set of statistic data with the at least one second set of statistic data for each stored data set to compute a set of difference values for each stored data set.

In step S10 succeeding to step S9, the method determines, based on the computed set of difference values for each set of statistic data, whether the charging infrastructure system 1 operates in an anomalous operating state.

If, for example, computed sets of statistic data in the first time interval (short time interval) of recent charging processes deviates significantly from the computed sets of statistics in the second time interval (long time interval), step S10 determines this as an anomalous state of the charging system. In particular, step S10 may compare the set of difference values computed in step S9 to a set of threshold values. If the calculated set of difference values exceeds the set of threshold values in step S10, an anomalous operating state of the charging infrastructure system 1 is determined.

In case step S10 determines an anomalous operating state to occur due to the set of difference values exceeding the set of threshold values, the method proceeds to step S11 and generates and issues (outputs) a system alert.

The system alert may include information on a detection of an anomalous operating state and data on the detected anomalous operating state of the infrastructure system 1. The data on the detected anomalous operating state may include data from the data set, such as an involved charging station 2, 3, 4, an electric vehicle type, and a charging station type for example.

In a specific embodiment, the method generates an email notification to a system engineer including the system alert.

The method may define for each set of statistic data an individual threshold value. If the respective set of statistic data deviates more than this threshold value for any set of statistic data, the corresponding charging process is considered notable and possibly indicating an anomalous behaviour of the charging infrastructure system 1.

The method may, in a training phase, define a suitable reasoning logic so that only relevant changes in the sets of statistic data are detected and result in generating and outputting a corresponding system alert. The reasoning logic can be realized by applying rule-sets to the sets of statistic data.

Alternatively, more sophisticated methods from the field of machine learning and anomaly detection can be used, for example, by comparing computed sets of statistical data calculated from measured values to predicted sets of statistic data values, which are predicted based on long-term data stored in the database 21.

Anomaly detection resolves the problem of detecting patterns in the data sets stored in the database 21 that do not conform to an expected and tolerable behavior of the charging infrastructure system 1. The applicability of anomaly detection in the current application scenario is due to the fact that anomalies in the data sets translate to significant and sometimes even critical information on operation of the charging infrastructure system 1. Anomalies are patterns in the data sets that do not conform to a notion of normal behavior or operating state.

Applying known approaches of anomaly detection in steps S9 and S10 of the method may use the calculated first and second set of statistic data computed in steps S7 and S8 and stored in the database 21 as basis (input).

The result of performing anomaly detection in step S9 provides an anomaly score.

The resulting anomaly score forms the basis for anomaly detection in step S10.

The method may comprise an additional logic step to determine a final anomaly score from the set of statistic data. If the determined final anomaly score exceeds a further threshold, a system alert can be generated. The additional logic step may rely on a rule set defined by a charging station operator, on a trained machine learning model such as a decision tree, a random forest algorithm, a neural network, in particular a deep neural network, or another kind of mathematical expression. In particular known methods belonging to state-of-the-art outlier detection, anomaly detection or time-series analysis can be utilized for this additional logic step.

The steps S7 to S10 may be repeated in a processing cycle at the predefined points in time t_calc, as indicated by the dotted lines in FIG. 1. The method performs step S11 in case during the processing cycle of S7 to S10, an anomalous operating state of the charging infrastructure system 1 is determined in step S10.

FIG. 2 provides an overview over structural elements of a charging infrastructure system 1 for electric vehicles EV using a simplified block diagram. The depicted charging infrastructure system 1 uses an embodiment of the system for detecting anomalous states in the charging infrastructure system 1.

The charging infrastructure system 1 includes a plurality of charging stations 2, 3, 4 arranged over a spatially extended area. Each charging station 2, 3, 4 is arranged at a charging station location and connected to a mains grid 5 for obtaining electric energy for operation for the charging station 2, 3, 4 and to supply energy in a suitable format, for example as AC or DC charging current 6 to the electric vehicle EV. The term charging station also encompasses wall boxes arranged in private estates besides charging stations on public ground.

The electric vehicle EV may be any kind of ground vehicle, air vehicle, boat or ship driven by means of at least one electric motor from an electric energy storage on board of the electric vehicle. The electric energy storage (the battery) includes electrochemical cell(s) storing electrical energy, Ground vehicles include in particular cars, trucks, busses, motorcycles, bicycles, trains, and scooters.

The electric vehicle EV may be a partially autonomous or fully autonomous operating vehicle.

The electric vehicle EV may be a plug-in hybrid electric vehicle PHEV, an electric vehicle powered by a battery that may be charged externally via the charging station 2, 3, 4. Alternatively, the electric vehicle EV is a battery electric vehicle BEV, which is an electric vehicle powered by a battery that needs to be charged externally via the charging station 2, 3, 4.

Each charging station 2, 3, 4 includes at least one charging slot, each charging slot enabling a charger 7 of the charging station to provide electric energy in form of the charging current 6 to an electric vehicle EV connected to the charging slot via a charging cable. The charging station 2, 3, 4 includes at least one processor 8 for controlling the charging process executed by the charger 7. In order to control the charging process, the processor 8 obtains determined, in particular measured, parameter values, determined or measured by the charger 7 and provides process parameters for the controlled charging process to the charger 7.

The processor 8 determines the process parameters from target characteristics for an intended charging process.

The charging station 2, 3, 4 further comprises a human machine interface 9 (HMI). The HMI 9 may include input/output means such as a touch-sensitive display, a monitor, and a keyboard for communicating with the user U of the charging station 2, 3, 4.

In particular, the charging station 2, 3, 4 obtains via the HMI 9 the target characteristics from the user U concerning the planned charging process for the electric vehicle EV.

The charging stations 2, 3, 4 each include a charging station network interface 11 for connecting via a network 19 with a central control facility. The network 19 may be an IP-based network, which enables data communication between the charging station network interface 11 and a control facility network interface 14 of the control facility. The control facility may perform tasks such as functional controlling of technical parameters of the charging infrastructure system 1 on the one hand and economic functions such as invoicing customers for the electric energy procured via the charging stations 2, 3, 4 on the other hand. The central control facility includes at least one control processor 13 for performing these functions. The control processor 13 may be implemented with one or more computer servers.

The HMI 9 of the charging station 2, 3, 4 is one possible embodiment for implementing a user dialog for acquiring the target characteristics of the planned charging process. Additionally or alternatively, a personal mobile device of the user U, for example a mobile wireless phone, a smartphone or a tablet computer, may be employed as hardware in-/output device to implement an HMI with the user U. The HMI may be implemented using the network 17 for communicating from and to the server 20 via the control facility network interface 14.

FIG. 2 arranges furthermore a server 20 and a database 21 at the control facility. The server 20 communicates with the charging stations 2, 3, 4 via the control facility network interface 14, the network 19 and the charging station network interface 11 of each charging station 2, 3, 4.

Alternatively or additionally, the server 20 and the database 21 may each include own network interfaces, and may communicate via the network 19 with each other and/or other components of the charging infrastructure system 1.

Alternatively, the server 20 and the database 21 may be located at another location than the central control facility and connected via the network 19 with the other components of the charging infrastructure system 1, such as the charging stations 2, 3, 4 and the central control facility.

The server 20 and the database 21 represent functional components of the charging infrastructure system 1 that perform the functions of the system for determining anomalous operating states of the charging infrastructure system 1. In particular, the server 20 includes one or more processors to perform the method steps discussed with respect to FIG. 1. The database 21 in particular stores the datasets generated for the charging processes, the first and second sets of statistic data and the set of difference values.

The server 20 may provide data messages 18 including system alerts and data on operating states of the charging infrastructure system 1 to the processor 13 of the central control facility.

Alternatively, the server 20 and the database 21 are entirely or at least partially integrated with the processors 8 and 13.

The server 20 and the database 21 may be implemented using a plurality of servers and data storages (memories) that store the database 21, thus in distributed manner.

The description of embodiments using FIGS. 1 and 2 focusses on determining anomalous system operating states in the charging infrastructure system 1 for electric vehicles EV.

The method, program and system may also be advantageously applied in the context of shared mobility services: in contrast to user feedback-based approaches, the method according to an embodiment would automatically compute a user satisfaction indicator based on a difference between a mobility option requested by a customer and a mobility option provided to the customer. The system would automatically compute a user satisfaction level based on the difference between the requested and the mobility option actually provided to the customer in response to his request.

Alternatively, the method, program and system may also be advantageously applied in the context of a navigation system: in case, due to global network efficiency or similar reasons, the system cannot always propose a shortest and most efficient route to a target, a customer satisfaction value could be automatically computed.

Alternatively, the method, program and system may also be advantageously applied in the context of routing systems: if, due to reasons such as global network efficiency, the routing system cannot offer a shortest path or a most efficient route, a customer satisfaction value could be automatically computed.

Alternatively, the method, program and system may also be advantageously applied in the context of charging infrastructure systems for charging energy storages different than those for electric vehicles: For example, the charging infrastructure system may comprise charging infrastructure for a plurality of rechargeable batteries for electric tools and autonomously operating working devices such as lawn mowers.

The target characteristics may be negotiated between the user U and the charging infrastructure system 1 covering plural charging processes each, in particular, but not limited to the last mentioned example of charging infrastructure for a plurality of rechargeable batteries for electric tools, autonomously operating working devices, or autonomous vehicles.

What is claimed is:

1. A method for detecting an anomalous operating state in a charging infrastructure system for charging batteries, the method comprising:
    for a charging process at a charging station:
        obtaining, for the charging process, target characteristics of the charging process;
        determining, for the charging process, process parameters based on the obtained target characteristics of the charging process;
        performing the charging process based on the determined process parameters;
        determining a performance metric for the performed charging process based on the obtained target characteristics;
        generating a data set for the performed charging process, wherein the data set comprises meta information of the performed charging process, the determined target characteristics of the performed charging process associated with determined variables for the performed charging process and the determined performance metric for the performed charging process; and
        storing the generated data set in a database; and
    for a plurality of charging processes:
        calculating and storing at least one first set of statistic data based on stored data sets in the database for a first time interval and at least one second set of statistic data based on the stored data sets in the database for a second time interval;
        comparing the at least one first set of statistic data with the at least one second set of statistic data for each stored data set to compute a set of difference values for each stored dataset; and
        determining for each data set, based on the computed set of difference values, whether the charging infrastructure system operates in an anomalous operating state.

2. The method according to claim 1, wherein the method further comprises:
    generating and outputting at least one of a system alert and failure data in case of determining an anomalous operating state of the charging infrastructure system.

3. The method according to claim 1, wherein the method further comprises:
    outputting the determined target characteristics to a user of the charging station, and accepting a user input that changes or selects at least one of the output target characteristics for the charging process.

4. The method according to claim 1, wherein
    the step of determining a performance metric includes determining a customer-satisfaction indicator as performance metric.

5. The method according to claim 1, wherein the method further comprises:
    determining, whether the charging infrastructure system operates in an anomalous operating state, by applying a method of anomaly detection on the first and second sets of statistic data.

6. The method according to claim 5, wherein
    the method of anomaly detection applied on the first and second set of statistic data comprises applying a predefined rule set or a trained machine learning model.

7. The method according to claim 6, wherein
    the method of anomaly detection applies the trained machine learning model, wherein the trained machine learning model includes a mathematical expression, in particular a decision tree, a random forest algorithm, a neural network, or a deep neural network.

8. The method according to claim 1, wherein
    the target characteristics of the charging process include at least one of a target state-of-charge, target charged energy, target minimum state-of-charge, target range, and target departure time.

9. The method according to claim 1, wherein
    determined variables of the charging process include at least one of date, time, identifier of charging station, location of charging station, type of charging station, type of the battery, model of electric vehicle, weather parameters, and termination type of charging process.

10. The method according to claim 1, wherein the method further comprises:
    computing additional sets of statistic data by filtering the determined variables of the charging process with respect to different features and calculating the additional sets of statistic data for the first time interval and the second time interval from the filtered determined variables; and
    storing the computed additional sets of statistic data in the database.

11. The method according to claim 10, wherein the method further comprises:
    determining, whether the charging infrastructure system operates in an anomalous operating state based on the computed set of difference values computed on the stored sets of statistic data including the computed additional sets of statistic data.

12. The method according to claim 1, wherein
    the first time interval is shorter than the second time interval.

13. The method according to claim 12, wherein
    the first time interval is shorter than the second time interval by an order of magnitude.

14. The method according to claim 1, wherein the method further comprises:
    adapting at least one of a first interval length of the first time interval and a second interval length of the second time interval based on the plurality of stored data sets or training data sets for the charging infrastructure system.

15. The method according to claim 14, wherein
    at least one of the first interval length and the second interval length is adapted by using machine learning and optimization methods.

16. A non-transitory computer readable medium storing a computer program with program-code to execute steps of:
for a charging process at a charging station:
obtaining, for the charging process, target characteristics of the charging process;
determining, for the charging process, process parameters based on the obtained target characteristics of the charging process;
performing the charging process based on the determined process parameters;
determining a performance metric for the performed charging process based on the obtained target characteristics;
generating a data set for the performed charging process, wherein the data set comprises meta information of the performed charging process, the determined target characteristics of the performed charging process associated with determined variables for the performed charging process and the determined performance metric for the performed charging process; and
storing the generated data set in a database; and
for a plurality of charging processes:
calculating and storing at least one first set of statistic data based on stored data sets in the database for a first time interval and at least one second set of statistic data based on the stored data sets in the database for a second time interval;
comparing the at least one first set of statistic data with the at least one second set of statistic data for each stored data set to compute a set of difference values for each stored dataset; and
determining for each data set, based on the computed set of difference values, whether the charging infrastructure system operates in an anomalous operating state.

17. A system for detecting an anomalous operating state in a charging infrastructure system for charging a battery, the system comprising:
at least one electric charger configured to charge the battery in a charging process;
an interface configured to obtain target characteristics of the charging process; and
at least one processor configured to:
determine for the charging process, process parameters of the charging process based on the obtained target characteristics;
determine a performance metric for the performed charging process;
generate a data set for the performed charging process, wherein the data set comprises meta information of the performed charging process, determined target characteristics of the performed charging process associated with determined variables for the performed charging process and the determined performance metric for the performed charging process;
store the generated data set in a database;
calculate and store at least one first set of statistic data for a first time interval based on a plurality of stored data sets in the database and at least one second set of statistic data for a second time interval based on the plurality of stored data sets in the database;
compare the at least one first set of statistic data with the at least one second set of statistic data for each stored data set to compute difference values for each stored data set; and
determine, based on the computed difference values for each data set, whether the charging infrastructure system operates in an anomalous operating state.

* * * * *